US009426946B2

(12) United States Patent
Fisher

(10) Patent No.: US 9,426,946 B2
(45) Date of Patent: Aug. 30, 2016

(54) COMPUTERIZED LEARNING LANDSCAPING APPARATUS AND METHODS

(71) Applicant: Brain Corporation, San Diego, CA (US)

(72) Inventor: Dimitry Fisher, San Diego, CA (US)

(73) Assignee: BRAIN CORPORATION, San Diego, CA (US)

( * ) Notice: Subject to any disclaimer, the term of this patent is extended or adjusted under 35 U.S.C. 154(b) by 0 days.

(21) Appl. No.: 14/558,403

(22) Filed: Dec. 2, 2014

(65) Prior Publication Data

US 2016/0150739 A1    Jun. 2, 2016

(51) Int. Cl.
*G06F 19/00*    (2011.01)
*A01G 3/04*    (2006.01)
(Continued)

(52) U.S. Cl.
CPC ............ *A01G 3/0435* (2013.01); *A01D 34/008* (2013.01); *G05D 1/0088* (2013.01); *G06Q 30/0241* (2013.01); *A01D 2101/00* (2013.01)

(58) Field of Classification Search
CPC .............. A01G 3/0435; A01D 34/008; A01D 2101/00; G05D 1/0088; G06Q 30/0241
USPC ....... 700/245, 247, 253, 254, 255, 258, 259, 700/262; 901/1, 3, 9, 47; 318/568.11, 318/568.12, 568.17, 580, 581, 587; 701/1, 701/23, 20, 22, 25, 26, 28, 408, 410, 523, 701/532; 180/167, 168, 169, 170, 252
See application file for complete search history.

(56) References Cited

U.S. PATENT DOCUMENTS 4,687,457 A    8/1987   Milner
4,820,233 A    4/1989   Weiner
(Continued)

FOREIGN PATENT DOCUMENTS

CN    102226740 A    10/2011
JP    H0487423 A     3/1992
(Continued)

OTHER PUBLICATIONS

Alexandros <g class="gr_gr_3 gr-alert gr_spell ContextualSpelling ins-del multiReplace" id="3" data-gr-id="3"Bouganis</g; and Murray Shanahan, "Training a Spiking Neural Network to Control a 4-DoF Robotic Arm based on Spike Timing-Dependent Plasticity", Proceedings of WCCI 2010 IEEE World Congress on Computational Intelligence, COB, Barcelona, Spain, Jul. 18-23, 2010, pp. 4104-4111.
(Continued)

*Primary Examiner* — McDieunel Marc
(74) *Attorney, Agent, or Firm* — Gazdzinski & Associates, PC

(57)    ABSTRACT

A method and an apparatus for shaping of lawns and hedges into desired 3D patterns or shapes. The apparatus consists of a bStem and/or other computational device comprising storage, a motorized platform, and trimmer end effectors. The computational device instructs the end effectors to extend or retract as the platform moves along at a steady pace, thus producing a target pattern (e.g., a company logo) in a hedge, lawn, a wall or a ground-cover of any material suitable for such shaping. The apparatus may be configured to operate autonomously based on a pre-loaded pattern file. Software (e.g., such as BrainOS) may be used to provide real-time feedback to trimmers regarding the process and the results, and possibly to train the inverse model accordingly. The apparatus may learn to minimize predicted or current mismatches between the desired pattern and the one being produced. Users compete for the best designs.

20 Claims, 8 Drawing Sheets

(51) Int. Cl.
*G06Q 30/02* (2012.01)
*G05D 1/00* (2006.01)
*A01D 34/00* (2006.01)
*A01D 101/00* (2006.01)

(56) References Cited

U.S. PATENT DOCUMENTS

| | | |
|---|---|---|
| 4,853,771 A | 8/1989 | Witriol et al. |
| 4,889,027 A | 12/1989 | Yokoi |
| 5,042,807 A | 8/1991 | Sasakawa et al. |
| 5,063,603 A | 11/1991 | Burt |
| 5,355,435 A | 10/1994 | DeYong et al. |
| 5,369,497 A | 11/1994 | Allen et al. |
| 5,378,188 A | 1/1995 | Clark |
| 5,638,359 A | 6/1997 | Peltola et al. |
| 5,673,367 A | 9/1997 | Buckley |
| 5,875,108 A | 2/1999 | Hoffberg et al. |
| 6,009,418 A | 12/1999 | Cooper |
| 6,014,653 A | 1/2000 | Thaler |
| 6,253,058 B1 | 6/2001 | Murasaki et al. |
| 6,259,988 B1 | 7/2001 | Galkowski et al. |
| 6,338,013 B1* | 1/2002 | Ruffner ............ A01B 69/008 180/167 |
| 6,429,291 B1 | 8/2002 | Turley et al. |
| 6,435,936 B1 | 8/2002 | Rehkemper et al. |
| 6,458,157 B1 | 10/2002 | Suaning |
| 6,545,705 B1 | 4/2003 | Sigel et al. |
| 6,545,708 B1 | 4/2003 | Tamayama et al. |
| 6,546,291 B2 | 4/2003 | Merfeld et al. |
| 6,547,631 B1 | 4/2003 | Randall |
| 6,560,511 B1 | 5/2003 | Yokoo |
| 6,565,407 B1 | 5/2003 | Woolington et al. |
| 6,581,046 B1 | 6/2003 | Ahissar |
| 6,615,108 B1* | 9/2003 | Peless ............ G05D 1/0219 180/167 |
| 6,682,392 B2 | 1/2004 | Chan |
| 6,697,711 B2 | 2/2004 | Yokono et al. |
| 6,760,645 B2 | 7/2004 | Kaplan et al. |
| 7,023,833 B1 | 4/2006 | Aiello et al. |
| 7,235,013 B2 | 6/2007 | Kobayashi |
| 7,849,030 B2 | 12/2010 | Ellingsworth |
| 8,015,130 B2 | 9/2011 | Matsugu et al. |
| 8,015,785 B2* | 9/2011 | Walker ............ A01D 34/005 56/202 |
| 8,145,355 B2 | 3/2012 | Danko |
| 8,145,492 B2 | 3/2012 | Fujita |
| 8,315,305 B2 | 11/2012 | Petre et al. |
| 8,467,623 B2 | 6/2013 | Izhikevich et al. |
| 8,527,094 B2 | 9/2013 | Kumar et al. |
| 8,731,295 B2* | 5/2014 | Schepelmann ...... A01D 34/008 382/164 |
| 8,793,205 B1 | 7/2014 | Fisher et al. |
| 8,880,222 B2 | 11/2014 | Kawamoto et al. |
| 8,954,193 B2* | 2/2015 | Sandin ............ 700/245 |
| 9,043,952 B2* | 6/2015 | Sandin |
| 2001/0045809 A1 | 11/2001 | Mukai |
| 2002/0038294 A1 | 3/2002 | Matsugu |
| 2002/0072293 A1 | 6/2002 | Beyo et al. |
| 2002/0081937 A1 | 6/2002 | Yamada et al. |
| 2002/0156556 A1* | 10/2002 | Ruffner ............ A01B 69/008 701/23 |
| 2002/0158599 A1 | 10/2002 | Fujita et al. |
| 2002/0183895 A1 | 12/2002 | Kaplan et al. |
| 2002/0198854 A1 | 12/2002 | Berenji et al. |
| 2003/0050903 A1 | 3/2003 | Liaw et al. |
| 2003/0232568 A1 | 12/2003 | Engel et al. |
| 2004/0016638 A1 | 1/2004 | Laconti et al. |
| 2004/0153211 A1 | 8/2004 | Kamoto et al. |
| 2004/0158358 A1 | 8/2004 | Anezaki et al. |
| 2004/0162638 A1 | 8/2004 | Solomon |
| 2004/0193670 A1 | 9/2004 | Langan et al. |
| 2004/0212148 A1 | 10/2004 | Losey et al. |
| 2005/0015351 A1 | 1/2005 | Nugent |
| 2005/0022751 A1 | 2/2005 | Nelson |
| 2005/0036649 A1 | 2/2005 | Yokono et al. |
| 2005/0049749 A1 | 3/2005 | Watanabe et al. |
| 2005/0065651 A1 | 3/2005 | Ayers et al. |
| 2005/0283450 A1 | 12/2005 | Matsugu et al. |
| 2006/0069448 A1 | 3/2006 | Yasui |
| 2006/0161218 A1 | 7/2006 | Danilov |
| 2007/0037475 A1 | 2/2007 | Spear |
| 2007/0176643 A1 | 8/2007 | Nugent |
| 2007/0208678 A1 | 9/2007 | Matsugu |
| 2007/0239315 A1 | 10/2007 | Sato et al. |
| 2007/0258329 A1* | 11/2007 | Winey ............ A63B 53/04 367/140 |
| 2008/0039974 A1* | 2/2008 | Sandin ............ G05D 1/0255 700/258 |
| 2008/0294074 A1 | 11/2008 | Tong et al. |
| 2009/0014402 A1 | 1/2009 | Wolf et al. |
| 2009/0043722 A1 | 2/2009 | Nugent |
| 2009/0153499 A1 | 6/2009 | Kim et al. |
| 2009/0287624 A1 | 11/2009 | Rouat et al. |
| 2010/0086171 A1 | 4/2010 | Lapstun |
| 2010/0091286 A1 | 4/2010 | Dahlgren |
| 2010/0166320 A1 | 7/2010 | Paquier |
| 2010/0286824 A1 | 11/2010 | Solomon |
| 2010/0292835 A1 | 11/2010 | Sugiura et al. |
| 2011/0016071 A1 | 1/2011 | Guillen et al. |
| 2011/0119214 A1 | 5/2011 | Breitwisch et al. |
| 2011/0119215 A1 | 5/2011 | Elmegreen et al. |
| 2011/0228742 A1 | 9/2011 | Honkasalo et al. |
| 2011/0245974 A1 | 10/2011 | Kawamoto et al. |
| 2012/0011090 A1 | 1/2012 | Tang et al. |
| 2012/0109866 A1 | 5/2012 | Modha |
| 2012/0143495 A1 | 6/2012 | Dantu |
| 2012/0173021 A1 | 7/2012 | Tsusaka |
| 2012/0185092 A1 | 7/2012 | Ku |
| 2012/0209428 A1 | 8/2012 | Mizutani |
| 2012/0209432 A1 | 8/2012 | Fleischer et al. |
| 2012/0211923 A1 | 8/2012 | Garner et al. |
| 2012/0303091 A1 | 11/2012 | Izhikevich |
| 2012/0308076 A1 | 12/2012 | Piekniewski et al. |
| 2012/0308136 A1 | 12/2012 | Izhikevich |
| 2013/0073491 A1 | 3/2013 | Izhikevich et al. |
| 2013/0073496 A1 | 3/2013 | Szatmary et al. |
| 2013/0073500 A1 | 3/2013 | Szatmary et al. |
| 2013/0077597 A1 | 3/2013 | Nukala et al. |
| 2013/0116827 A1 | 5/2013 | Inazumi |
| 2013/0151450 A1 | 6/2013 | Ponulak |
| 2013/0218821 A1 | 8/2013 | Szatmary et al. |
| 2013/0251278 A1 | 9/2013 | Izhikevich et al. |
| 2013/0325768 A1 | 12/2013 | Sinyavskiy et al. |
| 2013/0325773 A1 | 12/2013 | Sinyavskiy et al. |
| 2013/0325774 A1 | 12/2013 | Sinyavskiy et al. |
| 2013/0325775 A1 | 12/2013 | Sinyavskiy et al. |
| 2014/0016858 A1 | 1/2014 | Richert |
| 2014/0089232 A1 | 3/2014 | Buibas et al. |
| 2014/0175267 A1 | 6/2014 | Thiel et al. |
| 2014/0276951 A1 | 9/2014 | Hourtash et al. |
| 2015/0234385 A1* | 8/2015 | Sandin ............ G05D 1/0265 700/258 |

FOREIGN PATENT DOCUMENTS

| | | |
|---|---|---|
| RU | 2108612 C1 | 4/1998 |
| WO | WO-2008083335 A2 | 7/2008 |
| WO | WO-2010136961 A1 | 12/2010 |

OTHER PUBLICATIONS

Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet: <a href="http://msc.berkeley.edu/wjchen/publications/DSC12.sub.--8726.sub.--FI-.pdf">http://msc.berkeley.edu/wjchen/publications/DSC12.sub.--8726.sub.--FI-.pdf</a><http: />.

Bill Steele, The Human Touch Makes Robots Defter, Nov. 6, 2013, Cornell Chronicle. http://www.news.cornell.edu/stories/2013/11/human-touch-makes-robots-defter.

Bohte, 'Spiking Nueral Networks' Doctorate at the University of Leiden, Holland, Mar. 5, 2003, pp. 1-133 [retrieved on Nov. 14,

(56) References Cited

OTHER PUBLICATIONS

2012]. Retrieved from the interne <ahref="http://homepages.cwi.nl/~sbohte/publication/phdthesis.pdf">http://homepages.cwi.nl/~sbohte/publication/phdthesis.pdf</a><url: />.
Brette et al., Brian: a simple and flexible simulator for spiking neural networks, The Neuromorphic Engineer, Jul. 1, 2009, pp. 1-4, doi: 10.2417/1200906.1659.
Cuntz et al., 'One Rule to Grow Them All: A General Theory of Neuronal Branching and Its Paractical Application' PLOS Computational Biology, 6 (8), Published Aug. 5, 2010.
Davison et al., PyNN: a common interface for neuronal network simulators, Frontiers in Neuroinformatics, Jan. 2009, pp. 1-10, vol. 2, Article 11.
Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.
Fidjeland et al., Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber=5596678&tag=1.
Fidjeland, et al., "Accelerated Simulation of Spiking Neural Networks Using GPUs," WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.
Floreano et al., 'Neuroevolution: from architectures to learning' Evol. Intel. Jan. 2008 1:47-62, [retrieved Dec. 30, 2013] [retrieved online from URL:http://inforscienee.eptl.cb/record/112676/files/FloreanoDuerrMattiussi2008.pdf<http: />.
Gewaltig et al.. 'NEST (Neural Simulation Tool)', Scholarpedia, 2007. pp. 1-15. 2(4): 1430, doi: 1 0.4249/scholarpedia.1430.
Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.
Graham, Lyle J., The Surf-Hippo Reference Manual, http://www.neurophys.biomedicale.univparis5. fr/graham/surf-hippo-files/Surf-Hippo%20Reference%20Manual.pdf, Mar. 2002. pp. 1-128.
Hardware and Software Platform for Mobile Manipulation R&D, 2012, https://web.archive.org/web/20120128031010/http://www.willowgarage.com/pages/pr2/design.
Huh et al., "Generalized Power Law for Curve Movements" 2011.
Huh et al., "Real-Time Motor Control Using Recurrent Neural Networks" IEEEE Apr. 2009.
Huh, "Rethinking Optimal Control of Human Movements" Thesis 2012.
Ishii K., et al., Designing Laser Gesture Interface for Robot Control, Springer Berlin Heidelberg, Proceedings, Part II 12th IFIP TC 13 International Conference, Uppsala, Sweden, Aug. 24-28, 2009, Proceedings, pp. 479-492.
lzhikevich E.M. (2006) Polychronization: Computation With Spikes. Neural Computation, 18:245-282.
Izhikevich et al., 'Relating STDP to BCM', Neural Computation (2003) 15, 1511-1523.
Izhikevich, 'Simple Model of Spiking Neurons', IEEE Transactions on Neural Networks, vol. 14, No. 6, Nov. 2003, pp. 1569-1572.
Jain, Learning Trajectory Preferences for Manipulators via Iterative Improvement, 2013, Advances in Neural Information Processing Systems 26 (NIPS 2013).
Karbowski et al., 'Multispikes and Synchronization in a Large Neural Network with Temporal Delays', Neural Computation 12. 1573-1606 (2000).
Kasabov, "Evolving Spiking Neural Networks for Spatio-and Spectro-Temporal Pattern Recognition", IEEE 6th International Conference Intelligent Systems 2012 [Retrieved on Jun 24, 2014], Retrieved from the Internet: <ahref="http://ncs.ethz.ch/projects/evospike/publications/evolving-spiking-neural-networks-for-spatio-and-spectro-temporal-pattern-recognition-plenary-talk-ieee-is/view">http://ncs.ethz.ch/projects/evospike/publications/evolving-spiking-neural-networks-for-spatio-and-spectro-temporal-pattern-recognition-plenary-talk-ieee-is/view</a>.
Khotanzad. 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet URL: http://www-ee.uta.edu/eeweb/IP/Courses/SPR/Reference/Khotanzad.pdf.
Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail?id=1.
Laurent, 'The Neural Network Query Language (NNQL) Reference' [retrieved on Nov. 12, 2013]. Retrieved from the Internet: <URL'https://code.google.com/p/ nnql/issues/detail?id=1>.
Mordatch et al., "Discovery of Complex Behaviors through Contract-Invariant Optimization" ACM Transactions on Graphics (TOG)--SIGGRAPH 2012 Conference.
Nichols, A Reconfigurable Computing Architecture for Implementing Artificial Neural Networks on FPGA, Master's Thesis, The University of Guelph, 2003, pp. 1-235.
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com ].
Pavlidis et al. 'Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu!viewdoc/download?doi= 0.1.1.5.4346&rep—repl&type-pdf.
Pham et al., "Affine Invariance of Human Hand Movements: a direct test" 2012.
Pierre-Philippe Coupard, An Availabot-like computer-controlled push puppet for Linux, https://web.archive.org/web/20081106161941/http://myspace.voo.be/pcoupard/push_puppet_to_y/, 2008.
PR2 User Manual, Oct. 5, 2012.
Schaal et al., An Example Application of Policy Improvement with Path Integrals (Pl.sup.2), Jun. 9, 2010.
Schemmel, J., Grub!, A., Meier, K., Mueller, E.: Implementing synaptic plasticity in a VLSI spiking neural network model. In: Proceedings of the 2006International Joint Conference on Neural Networks (IJCNN'06), IEEE Press (2006) Jul. 16-21, 2006, pp. 1-6 [online], [retrieved on Aug. 24, 2012]. Retrieved from the Internet URL: http://www.kip.uniheidelberg. deNeroeffentlichungen/download.cgi/4620/ps/1774.pdf Introduction.
Simulink.RTM. model [online], [Retrieved on Dec. 10, 2013] Retrieved from <URL: http://www.mathworks.com/ products/simulink/index.html>.
Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Article with English Abstract).
Sjostrom et al., 'Spike-Timing Dependent Plasticity' Scholarpedia, 5(2):1362 (2010), pp. 1-18.
Suzuki et al.,Operation Direction to a Mobile Robot by Projection Lights, 2005 IEEE Workshop on Advanced Robotics and its Social Impacts, Jun. 12-15, 2005, pp. 160-165.

(56) References Cited

OTHER PUBLICATIONS

Szatmary et al "Spike-timing Theory of Working Memory" PLoS Computational Biology, vol. 6, Issue 8, Aug. 19, 2010 [retrieved on Dec. 30, 2013]. Retrieved from the Internet: URL: http://www.ploscompbioLorg/article/info%3Adoi%2F10.1371%2Fjournal,pcbi.1000879<url></url;>.

Tank D.W., et al., "Neural Computation by Concentrating Information in Time," Proceedings of the National Academy of Sciences of the United States of America, 1987, vol. 84 (7), pp. 1896-1900.

Todorov E., "Direct Cortical Control of Muscle Activation in Voluntary Arm Movements: a Model.," Nature Neuroscience, 2000, vol. 3 (4), pp. 391-398.

* cited by examiner

COMPUTERIZED LEARNING LANDSCAPING APPARATUS AND METHODS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates to robotic landscaping devices.

2. Description of the Related Art

Existing landscaping devices typically require a human operator. Human labor may be costly, and landscaping work performed by a human may be not reproducible and/or repeatable with a target degree or precision.

Thus, there may be a salient need for improved robotic landscaping apparatus configured to perform hedging and/or mowing operations autonomously.

SUMMARY

The present disclosure satisfies the foregoing needs by disclosing, inter alia, apparatus and methods relating to robotic landscaping devices.

In one aspect, a computerized motorized robotic apparatus is disclosed. In one embodiment, the computerized motorized robotic apparatus includes: a platform including a propulsion component; a shaping component including a plurality of end effectors, where at least one individual end effector is operable to extend and retract; and a controller component. In one variant, the controller component is configured to: operate the propulsion component to navigate the platform along a trajectory proximate a landscaping arrangement; and operate the plurality of end effectors to produce a three dimensional pattern in the landscaping arrangement.

In one implementation, the landscaping arrangement includes at least one of a grass lawn or a living hedge. In some cases, the three dimensional pattern is produced by the removal of at least a portion of foliage of the grass lawn or the living hedge. Furthermore, an analysis component may be configured to determine a parameter associated with the removed foliage, the parameter being selected from the group consisting of weight, color, and moisture content. Alternatively, the analysis component may be configured to determine a parameter associated with the removed foliage, the parameter being selected from the group consisting of presence of pesticides, herbicides and parasites.

In other implementations, the landscaping arrangement is selected from the group consisting of a soil patch, sand patch, a grass lawn, and a living hedge.

In yet other implementations, the controller component includes a non-volatile memory; and the three dimensional pattern is produced based on a design file stored in the non-volatile memory, the design file including a plurality of instructions. In other cases, the design file includes: a first plurality of instructions configured to cause the propulsion component to navigate the platform along the trajectory; and a second plurality of instructions configured to extend and retract the plurality of end effectors in a first dimension of the three dimensional pattern. In still other implementations the navigation of the platform along the trajectory is configured to produce a second dimension of the three dimensional pattern.

In some variants, the three dimensional pattern is a human readable text message.

In other variants, the three dimensional pattern is configured to represent a graphic mark, emblem, or symbol related to an entity.

In some implementations, the computerized motorized robotic apparatus includes a remote communications interface coupled to the controller, the remote communications configured to receive one or more instructions from a remote operator, the instructions configured to effectuate trajectory navigation and pattern production.

In other incarnations, the apparatus includes an aerial vehicle; individual ones of the plurality of end effectors include a rotating blade; and the rotating blade is configured to effectuate production of the pattern.

In some variants, the apparatus includes a sensor component configured to determine a distance between individual ones of the plurality of end effectors and the landscaping arrangement; and the controller is configured to determine a deviation between the three dimensional pattern and a target pattern. In still other variants, the controller is configured to operate a learning process configured to be adjusted based on the deviation; and the adjustment is configured to reduce a subsequent deviation during a subsequent production of the target pattern.

In another aspect, an autonomous apparatus for removal of vegetation is disclosed. In one embodiment, the autonomous apparatus includes: a motorized platform configured to displace the apparatus in at least two dimensions on a plane; a shaping component including an actuator coupled to a vegetation removing component; a nonvolatile memory configured to store information related to a target; a sensor component configured to detect vegetation obstructing the target; and a processing component configured to execute the plurality of instructions, the instruction execution configured to cause the removal of vegetation thereby exposing the target, the vegetation removal being characterized by an absence of additional instructions being provided by a human operator.

In still another aspect, a method of producing an advertisement from a living hedge is disclosed. In one embodiment, the method includes: providing a design file of the advertisement on a nonvolatile computer readable medium; operating a computerized motorized robotic apparatus, including one or more trimmer elements in accordance with the design file, the operation configured to: displace the apparatus along at least first dimension; and remove a portion of the living hedge along a second dimension thereby producing a two dimensional pattern in the living hedge.

In one variant, the second dimension is substantially orthogonal to the first dimension. In another variant, operating the computerized motorized robotic apparatus is configured to cause displacement of the apparatus along a third dimension, the third dimension being substantially orthogonal to the first dimension. In still other variants, operating the computerized motorized robotic apparatus is configured to cause removal of a portion of the living hedge along a third dimension, the third dimension substantially orthogonal to the second dimension.

Further features and various advantages will be apparent from the accompanying drawings and the following detailed description.

Figure 1:
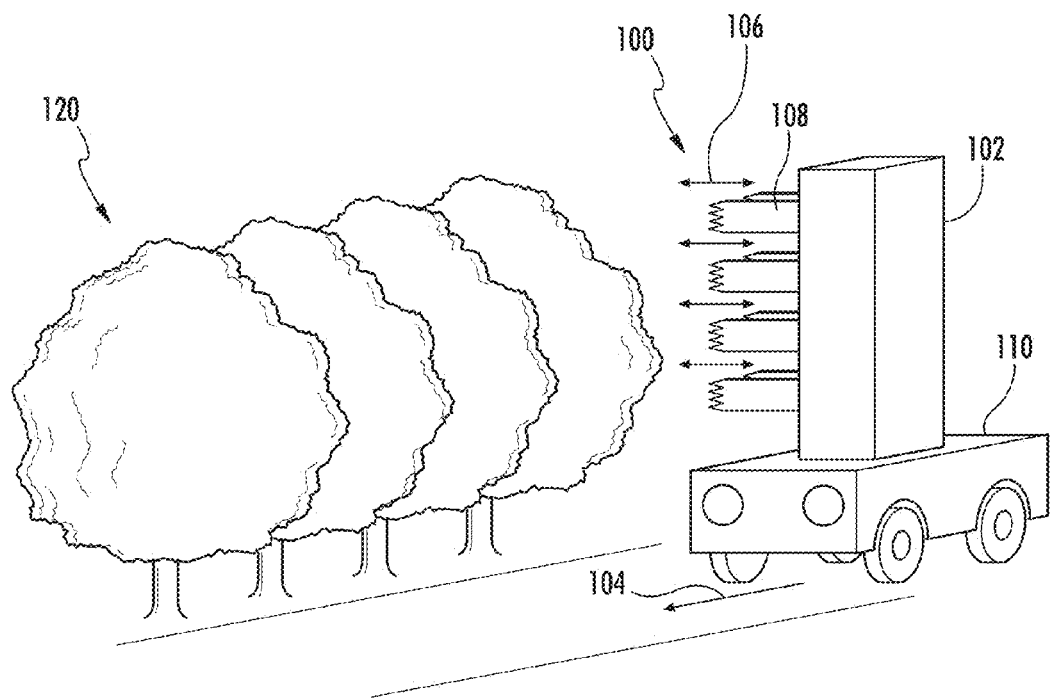
FIG. 1 is a graphical illustration depicting a robotic landscaping apparatus configured for 3-dimensional shaping of a hedge, in accordance with one implementation.

All Figures disclosed herein are © Copyright 2014 Brain Corporation. All rights reserved.

DETAILED DESCRIPTION

Implementations of the present disclosure will now be described in detail with reference to the drawings, which are provided as illustrative examples so as to enable those skilled in the art to practice the principles and architectures described herein. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present disclosure will be described, and detailed descriptions of other portions of such known components will be omitted so as not to obscure the principles and architectures described herein.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that are used to access the synaptic and neuron memory. The "bus" could be optical, wireless, infrared or another type of communication medium. The exact topology of the bus could be for example a standard "bus", hierarchical bus, network-on-chip, address-event-representation (AER) connection, or other type of communication topology used for accessing e.g., different memories in a pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic devices, personal communicators, tablet computers, portable navigation aids, cellular telephones, smart phones, personal integrated communication or entertainment devices, or any other devices capable of executing a set of instructions and processing an incoming data signal.

As used herein, the term "program", "computer program" or "software" is meant to include any sequence of human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, and/or other), Binary Runtime Environment (e.g., BREW), and the like.

As used herein, the term "memory" includes any type of integrated circuit or other storage device adapted for storing digital data including, without limitation: ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include all types of digital processing devices including, without limitation: digital signal processors (DSPs), reduced instruction set computers (RISC), general-purpose (CISC) processors, microcontrollers, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation: those of the IEEE Std. 1394 (e.g., FW400, FW800, and/or other), USB (e.g., USB2), Ethernet (e.g., 10/100, 10/100/1000 (Gigabit Ethernet), Thunderbolt™, 10-Gig-E, and/or other), Wi-Fi (802.11), WiMAX (802.16), PAN (e.g., 802.15), cellular (e.g., 3G, LTE/LTE-A/TD-LTE, GSM, and/or other) or IrDA families.

As used herein, the term "Wi-Fi" refers to, without limitation: any of the variants of IEEE-Std. 802.11 or related standards including 802.11 a/b/g/n/s/v.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, and/or other), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (i.e., IrDA).

Maintenance of grass lawns, living hedges, rock gardens, and/or other landscape fixtures (both living and inanimate) using existing landscaping devices may require manual operation labor by a human. Human labor may be costly and provide for inconsistent results.

The methodology described herein may be utilized for shaping of lawns and hedges into desired 3D patterns or shapes. In some implementations, a shaping apparatus may comprise a surface vehicle configured with one or more manipulators. The manipulators may comprise end effectors designed for removal of soft material or vegetation. As used herein, the term "effectors" is used generally to refer to any mechanical apparatus which is actuated in response to an electrical stimulus; common examples of effectors include without limitation e.g. trimmers, clippers, pruning shears, hot wires, spinning blades, spinning tines or wires, and/or other components. By way of an illustration, one or more manipulators may be operable in a plurality of degrees of freedom; an array of manipulators wherein individual array elements may be operable in degree of freedom.

In one or more implementations, the apparatus may comprise a rotary-wing or hybrid-lift aerial vehicle configured to etch an object being shaped (e.g. a hedge) using an end effector attached to and/or suspended from the aerial vehicle. In some implementations, the aircraft may utilize one or more of its rotors for shaping.

In some implementations, the shaping apparatus may comprise an autonomous platform configured to e.g. receive an AutoCAD and/or other file with the target 3D pattern and execute shaping of the hedge or lawn in accordance with the pattern. The shaping apparatus may comprise a bStem™ or other computational device (including associated storage), a motorized platform, and a mechanical applicator (e.g., a set of clippers and/or trimmer end effectors). The computational device may be configured to instruct the end effectors to extend and/or retract as the shaping apparatus traverses a target trajectory, thus producing a desired pattern (e.g. a logo of Brain Corporation™) in a hedge, a lawn, a wall or a ground-cover of any material suitable for such shaping.

The trajectory followed by the apparatus to produce the desired pattern may be generated by the apparatus, and/or be supplied with the pattern data. The apparatus may follow the trajectory and/or parts thereof once or several times, performing sequential refinement of the produced pattern and/or measurements of (but not limited to) deviation between the pattern produced and the pattern requested. Furthermore, this procedure may be repeated several times, partially or completely, in different conditions of, for example, wind, watering, insolation, and ambient temperature (say at different times of day or before and after watering), inasmuch as those factors affect the properties and appearance of the vegetation being shaped.

In one or more implementations, the apparatus may be tele operated by a human user. In some implementations, the learning and teleoperation may be implemented concurrently with one another. Using for example, a methodology described in e.g., U.S. patent application Ser. No. 13/842,583 entitled "APPARATUS AND METHODS FOR TRAINING OF ROBOTIC DEVICES", filed Mar. 15, 2013, the foregoing being incorporated herein by reference in its entirety, knowledge of the operator may be transferred to the learning process so that as the training progresses, the amount of input by the user may be reduced.

In one or more implementations, the apparatus may carry out the operation autonomously, being provided with a desired design in an electronic form (e.g. as a computer file or a set of instructions).

The computational device may be configured to operate a learning process, e.g., a Brain OS learning system described in, e.g., U.S. Provisional Patent Application Ser. No. 62/059,039 entitled "APPARATUS AND METHODS FOR TRAINING OF ROBOTIC DEVICES", filed Oct. 2, 2014, and/or U.S. patent application Ser. No. 13/842,530 entitled "ADAPTIVE PREDICTOR APPARATUS AND METHODS", filed Mar. 15, 2013, each of the foregoing being incorporated herein by reference in its entirety. The learning process may be used to modify operation of the shaping apparatus in real time based on real-time feedback from trimmers and/or sensors during shaping. The learning process may be configured to detect a discrepancy between the actual and the target shaping performance and responsively update the control process.

In one or more implementations, the learning process (e.g. implemented using Brain Corporation proprietary software and/or hardware) may be operable to minimize the discrepancy by, e.g., adapting and/or optimizing the sensory-motor control of the manipulators and/or by predicting the motor commands that would produce the desired result (for example, the commands that are most likely to produce the desired result, or that minimize the probability that the deviation exceeds certain instant or cumulative value).

In one or more implementations, the results of learning of one apparatus may be uploaded, stored, downloaded into another apparatus, and/or shared via an online depository, e.g. such as described in U.S. patent application Ser. No. 13/830,398 entitled "NEURAL NETWORK LEARNING AND COLLABORATION APPARATUS AND METHODS", filed Mar. 14, 2013, the foregoing being incorporated herein by reference in its entirety.

In one or more implementations, some of the removed material may be collected for analysis and/or analyzed in situ. For example, vegetation samples may be analyzed to determine and/or predict vegetation species, health, age, crop yield, presence of parasites, pesticides, herbicides, pathogens, commensals, beneficial or symbiotic organisms, chemicals, and/or other parameters. In other embodiments the removed material may be analyzed for weight, color, and moisture content. For example, the moisture content and color of cut grass may indicate the relative health of the lawn, and may also provide early warnings with regard to e.g., drought, over-watering, and/or other conditions.

Figure 2:
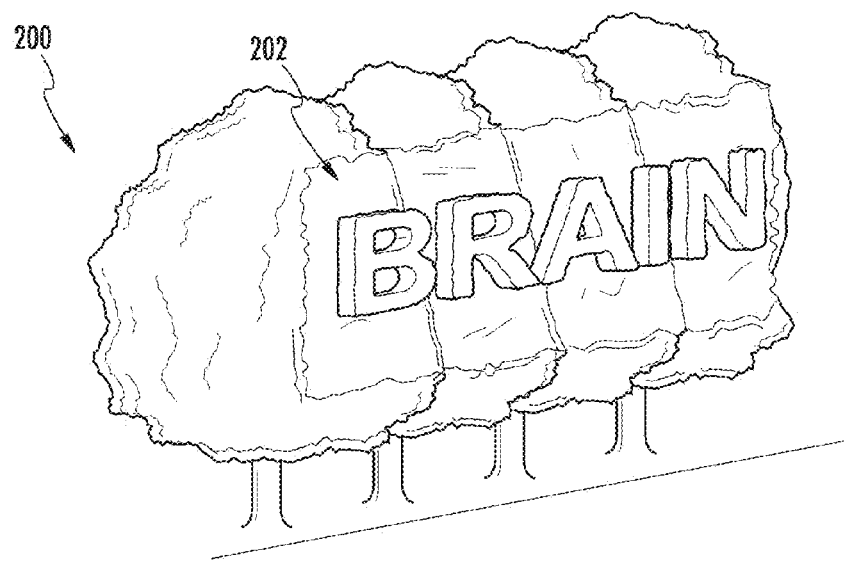
FIG. 2 is a graphical illustration depicting a pattern produced on a hedge by the robotic landscaping apparatus of, e.g., FIG. 1, in accordance with one implementation.

FIG. 1 illustrates use of a robotic landscaping apparatus configured for 3-dimensional shaping of a hedge, in accordance with one implementation. The apparatus 100 may comprise a computerized motorized platform 110 (e.g., a motorized cart, a tractor, and/or other self-propelled vehicle). The platform 110 may comprise a propulsion component (e.g., one or more motors, actuators, and/or other components) configured to propel the apparatus 100 along a trajectory. The apparatus 100 may comprise a cutting component 102 comprising a one or more articulated blades 108. In one or more implementations, the cutting component 102 may comprise an array of blades and/or end effectors. Individual blades and/or end effectors that may be individually configured to extend and/or retract in a direction 106. In some implementations (not shown), one or more blades 108 may be configured to be adjusted along a vertical axis. The individual end effectors may be operable to trim or clip excess vegetation that it comes in contact with the effector, in a small area. The platform 110 may be propelled (e.g., shown by arrow 104) along the hedge 120 and/or a lawn. The end effectors 108 may extend/retract so as to remove excess vegetation (e.g. grass, foliage). The remaining vegetation may form a desired 3-dimensional (3D) shape, e.g., such as illustrated by the pattern 202 on the hedge 200 of FIG. 2. In some implementations, the component 102 may be adapted (customized) for a given application (e.g., smaller blades for fine patterns, larger blades for larger patterns and/or high speed shaping), and/or material (e.g., wall stucco, woody hedge, leafy hedge, ice, and/or other materials), terrain, and/or other customizations.

Figure 3:
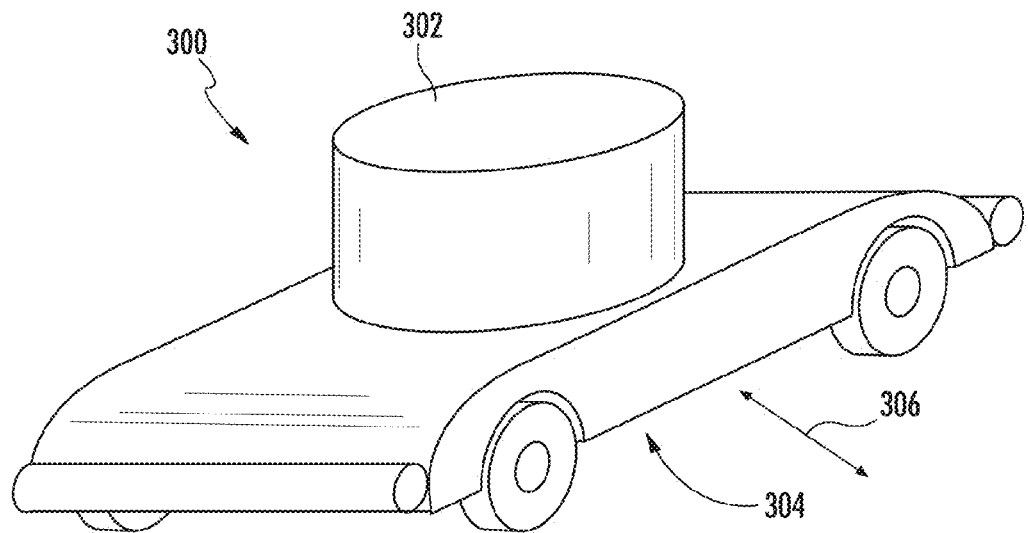
FIG. 3 is a graphical illustration depicting a robotic lawnmower apparatus configured for 3-dimensional shaping of a lawn, in accordance with one implementation.

FIG. 3 illustrates a robotic lawnmower apparatus configured for 3-dimensional shaping of a lawn, in accordance with one implementation. The apparatus 300 may comprise a computerized controller (e.g., 600 in FIG. 6), one or more wheels, a motor, and a cutting component 302. The cutting component 302 may comprise a blade component 304.

Figure 4:
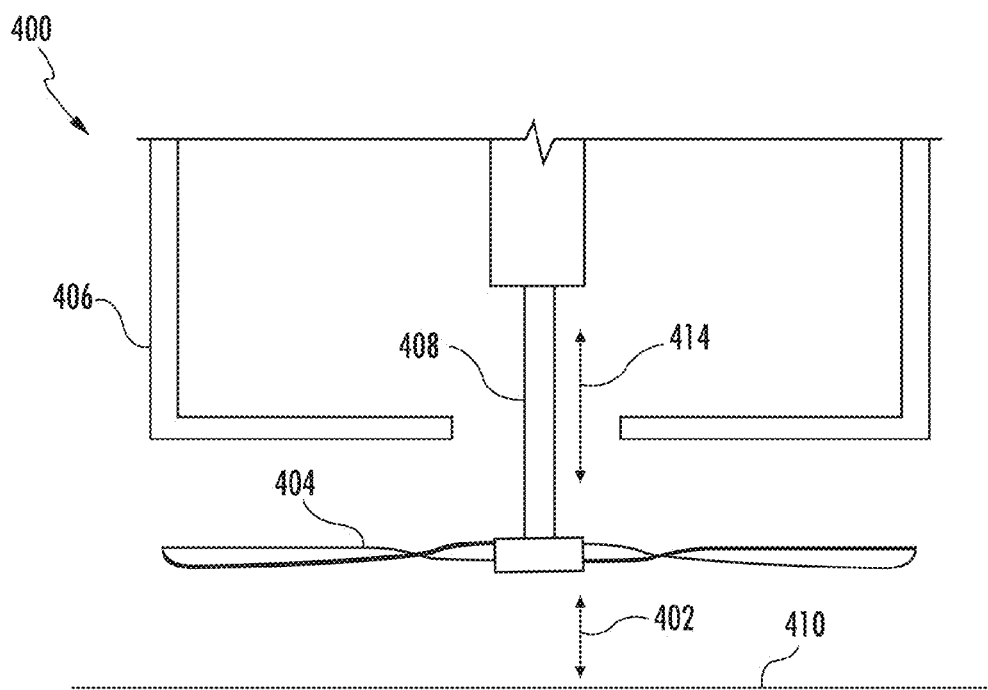
FIG. 4 is a graphical illustration depicting a retractable blade configuration for use with the robotic lawnmower apparatus of, e.g., FIG. 3, in accordance with one implementation.

FIG. 4 illustrates a cutting component 400 comprising retractable blades for use with the robotic lawnmower apparatus of, e.g., FIG. 3, in accordance with one implementation. The component 400 may comprise a housing 406 configured to be disposed at the bottom portion of the lawnmower apparatus 300. The component 400 may comprise a blade assembly comprising one or more blades 404 disposed on a movable shaft 408. The shaft may be configured to be moved in a direction 414 thereby enabling adjustment of distance 402 between the blade 404 and the surface of the lawn and/or the ground 410. In some implementations, the blade assembly 408, 404 may be configured to move laterally (e.g., transverse to the direction of motion, as shown by arrow 306 in FIG. 3). In some implementations, the blade component 400 may comprise a plurality of blades of one or more sizes (not shown).

Figure 5A:
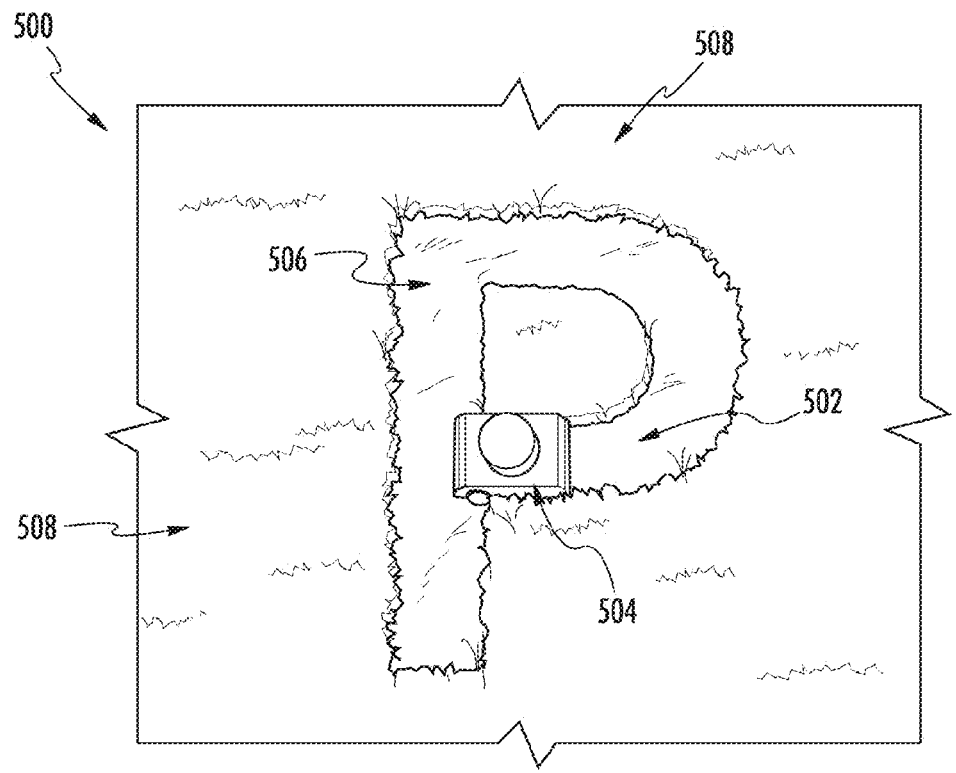
FIG. 5A is a graphical illustration depicting a generation of a pattern by a robotic landscaping apparatus of, e.g., FIG. 3, in accordance with one implementation.

FIG. 5A illustrates a generation of a pattern by a robotic landscaping apparatus of, e.g., FIG. 3, in accordance with one implementation. The robotic lawnmower apparatus 504 in FIG. 5A may be configured to navigate the lawn 500 in accordance with a target trajectory. The trajectory may comprise one or more portions (e.g., 502). The apparatus 504 may comprise a computerized controller, e.g., 600 of FIG. 6. The apparatus 504 may be operable to navigate the target trajectory based on a design file that may be loaded into the controller, and/or a plurality of instructions communicated to the apparatus 504 via a remote link. In some implementations, the design file may comprise a plurality of instructions configured to communicate to the controller trajectory of the platform 504 (e.g., the apparatus 300 in FIG. 3) and/or trajectory of one or more cutting elements (e.g., the blades 404 in FIG. 4, the end effectors 108 in FIG. 1 and/or other shaping components). The cutting component of the apparatus 504 may be configured to adjust distance to the lawn/ground (e.g., distance 402 in FIG. 4). The outcome of the trajectory navigation by the apparatus 504 may result in a portion of the lawn (e.g., 506) having lower grass height compared to the surrounding lawn (e.g., 508).

Figure 5B:
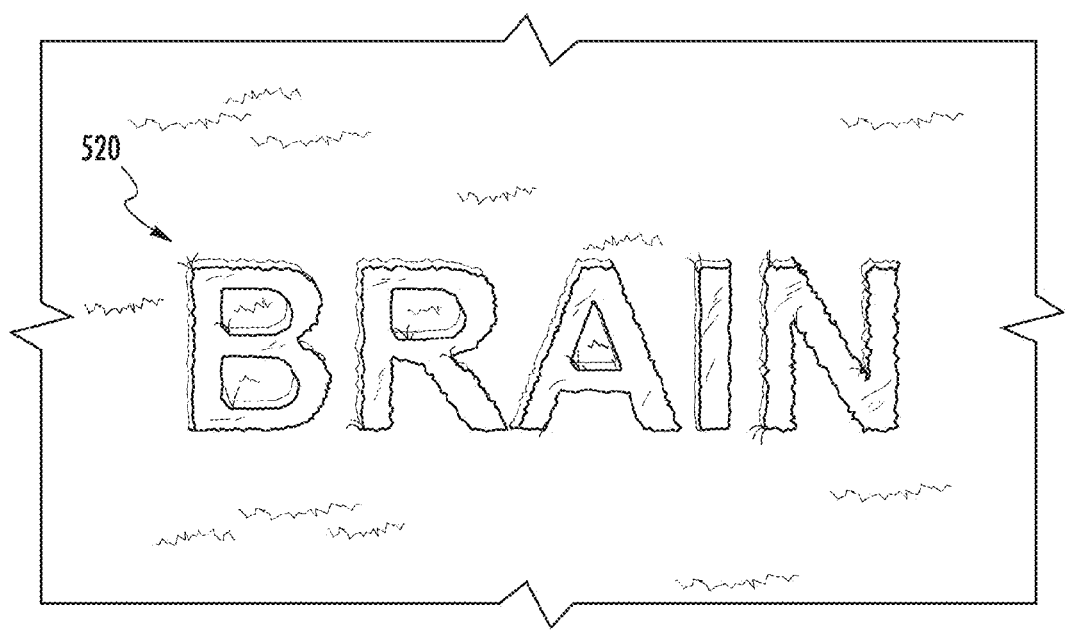
FIG. 5B is a graphical illustration depicting a lawn pattern that may be produced by a robotic landscaping apparatus of, e.g., FIG. 5A, in accordance with one implementation.

FIG. 5B illustrates a lawn pattern 520 that may be produced by a robotic landscaping apparatus, e.g., the apparatus 504 of FIG. 5A, in accordance with one implementation. In some implementations, the methodology described herein may be utilized to produce patterns visible from above in sand and/or soil using a computerized motorized apparatus comprising a shaping attachment that may be configured for the respective medium (e.g., rake-type and/or a blade attachment for shaping sand).

Figure 6:
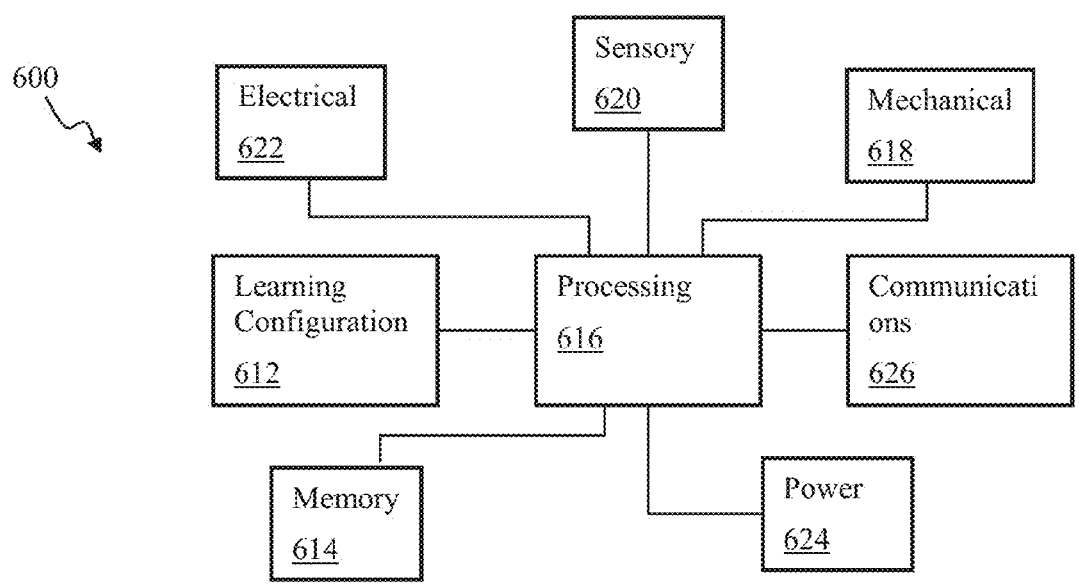
FIG. 6 is a functional block diagram illustrating components of a computerized robotic apparatus, in accordance with one implementation.

FIG. 6 illustrates components of a computerized controller for a robotic landscaping apparatus, in accordance with one implementation. The controller apparatus 600 may comprise a learning configuration (robotic brain) component 612 for control of the robotic landscaping apparatus (e.g., 100 in FIG. 1). The learning configuration component 612 may be logically implemented within a processor that executes a computer program embodied as instructions stored in non-transitory computer readable media, and configured for execution by the processor. In some implementations, the component 612 may be implemented as dedicated hardware, programmable logic (e.g., field programmable gate arrays (FPGAs), and/or other logical components), application specific integrated circuits (ASICs), and/or other machine implementations. In some implementations, the component 612 may comprise a machine executable code (e.g., software and/or firmware library, e.g., BrainOS™ described in U.S. Provisional Patent Application Ser. No. 62/059,039 entitled "APPARATUS AND METHODS FOR TRAINING OF ROBOTIC DEVICES", filed Oct. 2, 2014, previously incorporated by reference) stored on a non-volatile medium and configured to be executed by e.g., a processing component 616 described below. In one or more implementations, the learning process operation may be effectuated by a BrainOS software platform that may include software configured to instantiate modules and/or robotic brain images, and containing learning algorithms not limited to artificial neural networks and other machine learning algorithms. The BrainOS software platform may provide functionality for a software module that may be typical of an operating system including but not limited to: saving, loading, executing, duplicating, restoring, reverting, check pointing, analyzing, debugging, and uploading/downloading operations to/from remote cloud storage. In some implementations, the BrainOS modules or robotic brain images may be used with the intent to control a robotic device and be broadly construed to include actuators and switches as may be present in a motorized landscaping apparatus.

The apparatus 600 may comprise a processing component 616. The component 616 may be implemented as dedicated hardware, programmable logic (e.g., field programmable gate arrays (FPGAs), and/or other logical components), application specific integrated circuits (ASICs), system on a chip, and/or other machine implementations.

In some implementations, the processing component 616 may be embodied in a specialized computerized apparatus (e.g., bStem™ integrated platform, described in, http://www.braincorporation.com/specs/BStem_SpeeSheet_Rev_Nov11_2013.pdf, the foregoing being incorporated herein by reference in its entirety. In one or more implementations, the processing component 616 comprises a general use computerized apparatus (e.g., a tablet, a smartphone, a computer, and/or other computerized device) configured to operate the BrainOS library.

The processing component 616 may be configured to operate, inter alia, the learning process, a feature detection process, navigation component (e.g., the platform 110 in FIG. 1 and/or lawnmower 300 in FIG. 3), and/or shaping/cutting component (e.g., 102 in FIG. 1 and/or 408, 406 in FIG. 4).

The processing component 616 may interface with the mechanical components 618, sensory components 620, electrical components 622, power components 624, and communications (comms) component 626 via one or more driver interfaces and/or software abstraction layers. The sensory components 620 may enable the apparatus 600 to accept stimulus from external entities. Input stimulus types may include, without limitation: video, audio, haptic, capacitive, radio, accelerometer, ultrasonic, infrared, thermal, radar, lidar, sonar, and/or other sensed inputs. The sensory component 620 may comprise one or more of a camera, an acoustic sensor, touch sensor, proximity, radio frequency, positioning, inertial motion, and/or other sensors that may be useful for operating motorized landscaping apparatus. In one or more implementations, the sensory component 620 may be configured to provide positioning information, e.g., via GPS and/or DGPS approach. By way of an illustration, the sensory component 620 may comprise a radio frequency receiver configured to receive information related to position of the apparatus 600 from a GPS base station. In some implementations, one apparatus 600 may be configured to provide positioning information (e.g., differential corrections) to another apparatus 600.

The processing component 616 may be operable to perform sensory processing e.g., feature detection, object detection, tracking, stereo vision, and/or other tasks. In some implementations, the feature detection process may comprise one or more of nearest neighbor classifier, artificial neuron network perceptron, and/or feature detection operations described in, e.g., U.S. Provisional Patent Application Ser. No. 62/059,039 entitled "APPARATUS AND METHODS FOR TRAINING OR ROBOTIC DEVICES", filed Oct. 2, 2014, incorporated supra, and/or Ser. No. 14/542,391 entitled "FEATURE DETECTION APPARATUS AND METHODS FOR TRAINING OF ROBOTIC NAVIGATION", filed Nov. 14, 2014, the foregoing being incorporated by reference in its entirety.

In one or more implementations, the power components 624 may comprise one or more of a direct current, an alternating current source, a mechanical coupling, an energy accumulator (and/or a mechanical energy means (e.g., a flywheel, a wind-up apparatus), a wireless charger, a radioisotope thermoelectric generator, a piezo-generator, a dynamo generator, a fuel cell, an internal or external combustion engine, a pneumatic power source, a hydraulic power source, and/or other power sources. The power system 624 may be configured to support various use scenarios of the device. For example, for a mobile robot, a wireless power solution (e.g. battery, solar cell, inductive (contactless) power source, rectification, and/or other mobile power source) may be appropriate. However, for fixed location applications which consume significant power (e.g., to move heavy loads, and/or other power intensive tasks), a mains power supply (or similar high capacity solution) may be a better fit. In addition, in some implementations, the power system and or power consumption may be configured with the training of the robotic apparatus 600. Thus, the robot may improve its efficiency (e.g., to consider power consumption efficiency) through learned management techniques specifically tailored to the tasks performed by the robotic apparatus. In one or more implementations, power component may comprise an interface configured to receive external power (e.g., a via a tether).

The apparatus 600 may comprise memory component 614. The memory 614 may comprise nonvolatile memory (e.g., FLASH, magnetic, optical) configured to store learning configuration, configuration and/or operating parameters of the landscaping robot and/or other parameters that may be required for hardware/firmware/software needs of the robotic device.

Additional processing and memory capacity (not shown) may be used to support these processes. However, it will be appreciated that the aforementioned components (e.g., mechanical components 618, sensory components 620, electrical components 622) may be fully controlled based on the operation of the learning configuration 612. Supplemental memory and processing capacity may also aid in management of the controller apparatus (e.g. loading executable code (e.g., a computational brain image), replacing the executable code, executing operations during startup, and/or other operations). As used herein, a "computational brain image" may comprise executable code (e.g., binary image files), object code, bytecode, an array of weights for an artificial neuron network (ANN), and/or other computer formats. In some implementations, one or more brain images may be loaded into memory of the apparatus 600, e.g., as described in detail in U.S. Pat. No. 8,793,205, issued Jul. 29, 2014 and entitled "ROBOTIC LEARNING AND EVOLUTION APPARATUS", the foregoing being incorporated herein by reference in its entirety.

Consistent with the present disclosure, the various components of the device may be remotely disposed from one another, and/or aggregated within one of more discrete components. For example, learning configuration software may be executed on a server apparatus, and control the mechanical components of a robot via a network or a radio connection. In another such example, multiple mechanical, sensory, and/or electrical units may be controlled by a single robotic brain via network/radio connectivity.

The mechanical components 618 may include virtually any type of component capable of propelling motorized robotic platform along a trajectory and/or shaping components (e.g., 108 404, 408 in FIGS. 1, 4, respectively) so as to perform a desired function or task. These may include, without limitation: motors, servos, pumps, hydraulics, pneumatics, stepper motors, rotational plates, micro-electro-mechanical devices (MEMS), electro-active polymers, trimmers, blades, scissors, cutting wheels, rakes, shovel, pike, and/or other components configured to shape the respective external objects (lawn, trees, shrubs) and/or materials (sand, snow, soil). The components interface with the learning configuration and enable physical interaction and manipulation of the device.

The electrical components 622 include virtually any electrical component for interaction and manipulation of the external environment. These may include, without limitation: light/radiation generating components (e.g. light emitting diodes (LEDs), infrared (IR) sources, incandescent light sources), audio components, monitors/displays, switches, heating elements, cooling elements, ultrasound transducers, lasers, and/or other).

The communications component 626 may include one or more connections configured to interact with users and/or external computerized devices to allow for, inter alia, management and/or control of the robotic landscaping apparatus. The connections may include any of the wireless or wireline interfaces discussed above, and further may include customized or proprietary connections for specific applications.

The learning component 612 may be configured to operate the robotic landscaping apparatus in accordance with a trajectory. In some implementations, the trajectory may be determined based on a pre-loaded pattern file. e.g., stored in the memory 614. In one or more implementations, the trajectory may be configured based on one or more commands received by the apparatus 600 via, e.g., communications component 626. Learning process (e.g., BrainOS) may be used to provide real-time feedback to one or more shaping components (e.g., trimmers) regarding the shaping process and its results. The learning process may be updated in order to minimize predicted or current mismatch between the desired pattern and the one being produced.

FIGS. 7A-9 illustrate methods of training and/or operating a computerized robotic landscaping of the disclosure in accordance with one or more implementations. The operations of methods 700, 720, 800, 900 presented below are intended to be illustrative. In some implementations, methods 700, 720, 800, 900 may be accomplished with one or more additional operations not described, and/or without one or more of the operations discussed. Additionally, the order in which the operations of methods 700, 720, 800, 900 are illustrated in FIGS. 7A-9 described below is not intended to be limiting.

Methods 700, 720, 800, 900 may be implemented in one or more processing devices (e.g., a digital processor, an analog processor, a digital circuit designed to process information, an analog circuit designed to process information, a state machine, and/or other mechanism for electronically processing information and/or configured to execute computer program modules stored as computer readable instructions). The one or more processing devices may include one or more devices executing some or all of the operations of methods 700, 720, 800, 900 in response to instructions stored electronically on a non-transitory electronic storage medium. The one or more processing devices may include one or more devices configured through hardware, firmware, and/or software to be specifically designed for execution of one or more of the operations of methods 700, 720, 800, 900. The operations of methods 700, 720, 800, 900 may be implemented by a learning controller apparatus (e.g., 600 in FIG. 6) configured to control a robotic landscaping appliance (e.g., 100 in FIG. 1).

Figure 7A:
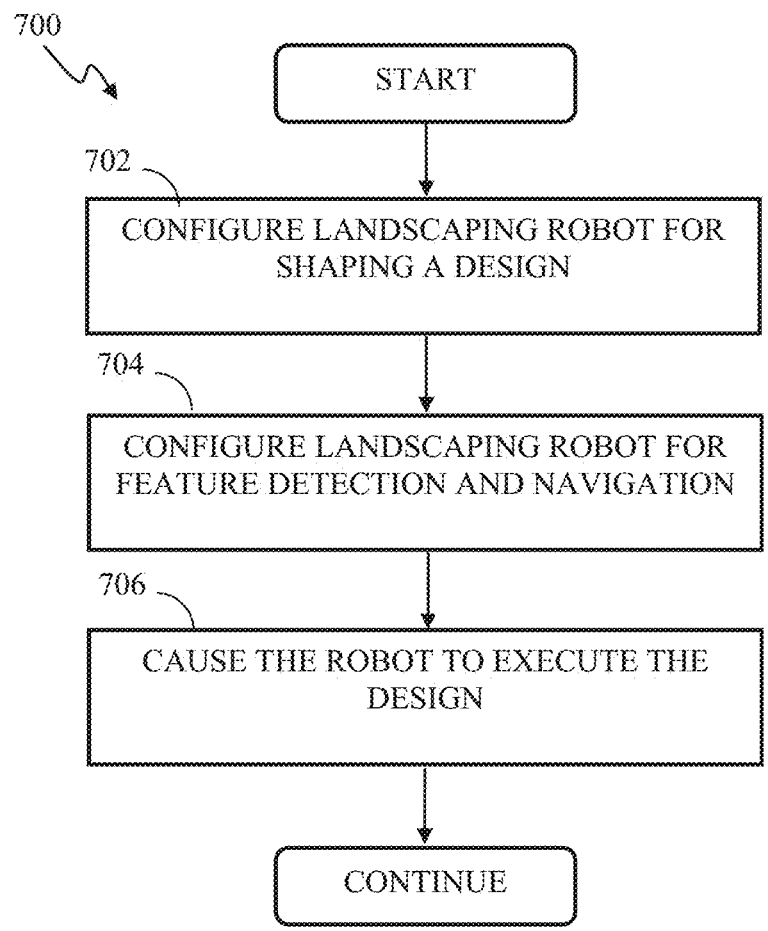
FIG. 7A is a logical flow diagram depicting a generalized method for operating a robotic landscaping appliance in accordance with one implementation.

FIG. 7A depicts a generalized method for operating a robotic landscaping appliance in accordance with one implementation.

At operation 702 of method 700, a landscaping robot may be configured for shaping a design. In one or more implementations, the operation of configuring the robot may comprise configuring the motorized platform in accordance with the operating surface (e.g., lawn, road, ice, soil, sand, and/or other), configuring the shaping component (e.g., trimmers, blades, shovels, rake, and/or other), configuring communication link parameters (e.g., initializing a wireless communications link (e.g., Wi-Fi, Bluetooth) the communications component 626), configuring the trajectory and/or design operations (e.g., loading design file text and size of the company logo), and/or other configuration.

At operation 704 of the method 700, the landscaping robot may be configured for feature detection and navigation. In some implementations, the controller configuration may comprise configuring a learning process (e.g., a K nearest-neighbor (kNN) classifier process, etc.), configuring a feature detection process, e.g., detection of edges, corners, color patches, patches of brightness/texture, motion, audio patterns, and/or other persistent signal patterns that may be relevant to a given task.

At operation 706 the robot executes the design. In some implementations, the robot may be operated autonomously, e.g., using autonomous navigation along a trajectory determined by the design file and/or using feature detection and/or motor control prediction capability. In one or more implementations, the robot may be operated remotely (tele operated) by a user using a remote interface (e.g., radio wave, infrared, sound, and/or other).

Figure 7B:
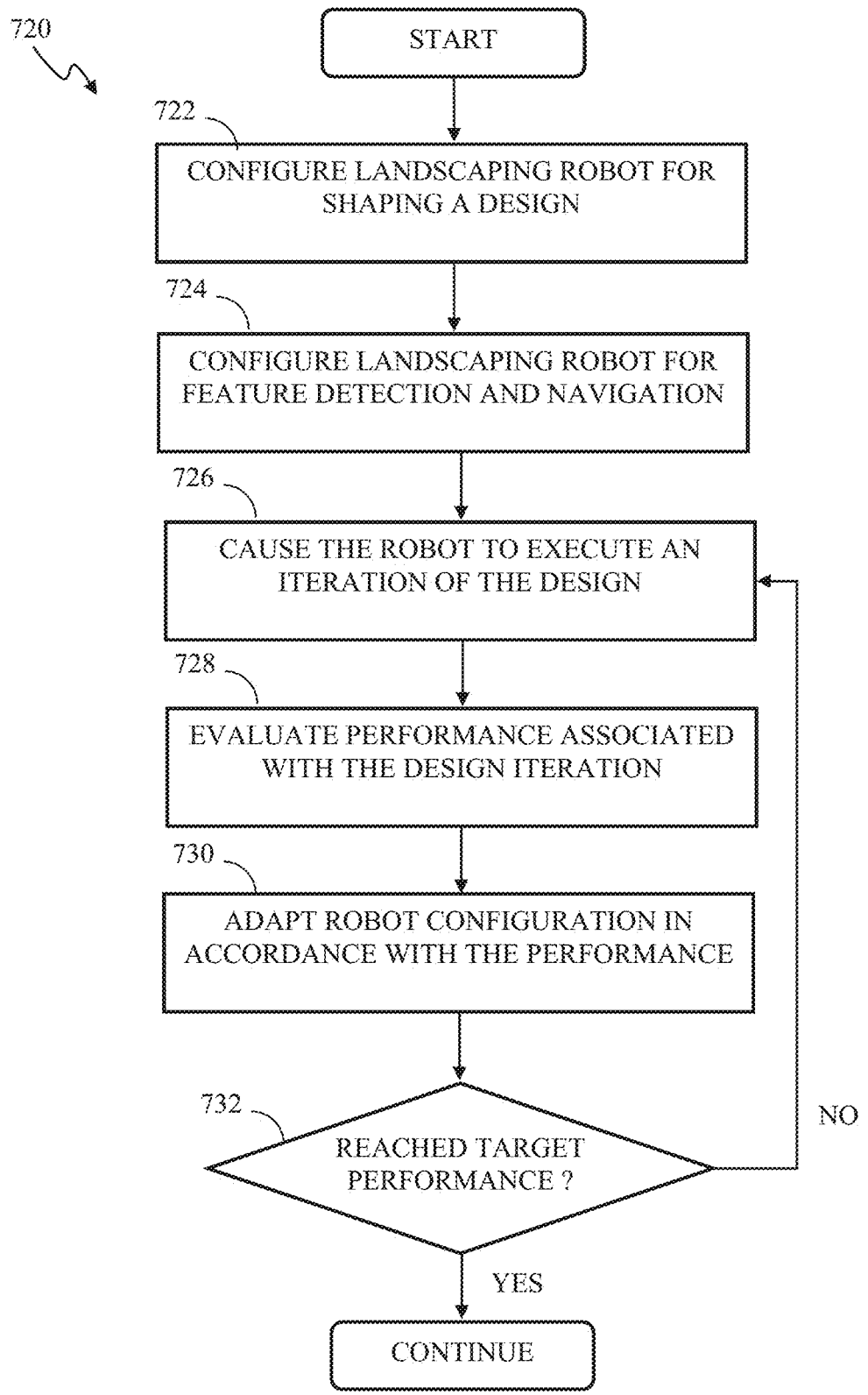
FIG. 7B is a logical flow diagram depicting a method for iterative design shaping by a robotic landscaping appliance in accordance with one implementation.

FIG. 7B depicts a method for iterative design shaping by a robotic landscaping appliance in accordance with one implementation.

At operation 722 of method 720, a landscaping robot may be configured for shaping a design. In one or more implementations, the operation of configuring the robot may comprise configuring the motorized platform in accordance with the operating surface (e.g., lawn, road, ice, soil, sand, and/or other), configuring the shaping component (e.g., trimmers, blades, shovels, rake, and/or other), configuring communication link parameters (e.g., initializing a wireless communications link (e.g., Wi-Fi, Bluetooth) the communications component 626), configuring the trajectory and/or design operations (e.g., loading design file text and size of the company logo), and/or other configuration.

At operation 724 of the method 720, the landscaping robot may be configured for feature detection and navigation. In some implementations, the controller configuration may comprise configuring a learning process (e.g., a K nearest-neighbor (kNN) classifier process, etc.), configuring a feature detection process, e.g., detection of edges, corners, color patches, patches of brightness/texture, motion, audio patterns, and/or other persistent signal patterns that may be relevant to a given task.

At operation 726 the robot may execute an iteration of the design. In some implementations, the robot may be operated autonomously, e.g., using autonomous navigation along a trajectory determined by the design file and/or using feature detection and/or motor control prediction capability. In one or more implementations, the robot may be operated remotely (tele operated) by a user using a remote interface (e.g., radio wave, infrared, sound, and/or other). In one or more implementations of producing a lawn or a hedge design, the design iteration execution may comprise a preliminary ("rough") pass, e.g., performed with a high speed and/or large span cutting tool configured to remove a substantial portion (e.g., greater than 50%) of vegetation. By way of an illustration of design described above with respect to FIG. 5A, the iteration may correspond to grass removal along vertical element of the letter 'P'.

At operation 728 of method 720, a performance associated with the design iteration produced at operation 726 may be determined. In some implementations, the performance measure may comprise a discrepancy determined from actual values of size/position of the design elements being produced (e.g., size/location of letters in the company logo of FIGS. 2,5B), the position of the end effectors/trimmers, the elapsed time, the force being applied to actuators, and/or other parameters that may be determined during operation of the robot and target values of the respective parameter. By way of an illustration, with reference to FIG. 5A, the performance measure may be determined based on a comparison of actual vegetation extend relative to vegetation extent of the design.

At operation 730, configuration of the landscaping robot may be adapted. In one or more implementations, the adaptation may comprise one or more of cutting tool addition, removal, replacement (e.g., a tool with a smaller blade and/or a finer control), control process adaptation (e.g., as described with respect to FIG. 8 below), and/or other operation.

At operation 732 a determination may be made as to whether the design has been produced with a target performance. In one or more implementations, the target performance may be configured based on elapsed time of operation, number of iterations, amount of removed material, deviation from the target pattern, change relative a prior iteration, and/or other measures. Responsive to a determination at operation 732 that the target performance has not been reached, the method may proceed to operation 726 to perform another iteration.

Figure 8:
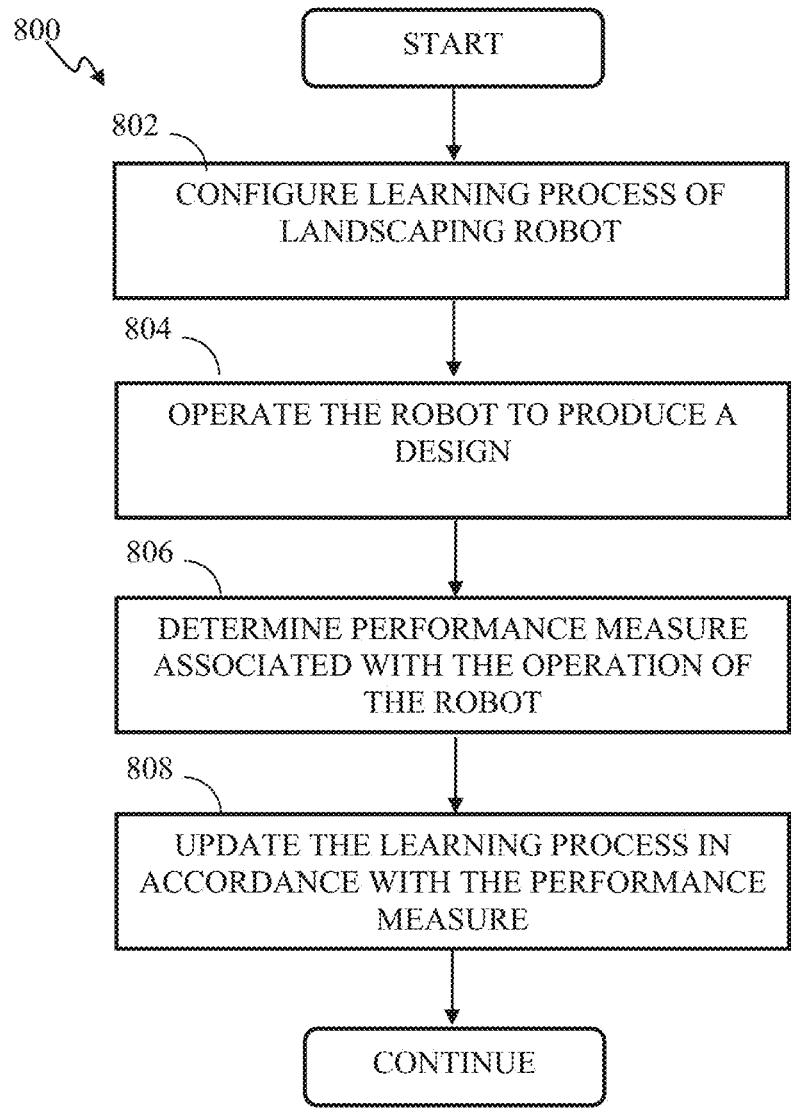
FIG. 8 is logical flow diagram illustrating a method of training a robotic appliance apparatus, in accordance with one or more implementations.

FIG. 8 illustrates a method of training a landscaping robotic apparatus for executing a shaping design, in accordance with one or more implementations.

At operation 802 of method 800, a learning process of the landscaping robot may be configured. In one or more implementations, the learning process may comprise a predictor configured to associate one or more motor commands with sensory context, using methodology such as described in e.g., U.S. Provisional Patent Application Ser. No. 62/059,039 entitled "APPARATUS AND METHODS FOR TRAINING OF ROBOTIC DEVICES", filed Oct. 2, 2014, and/or U.S. patent application Ser. No. 13/842,530 entitled "ADAPTIVE PREDICTOR APPARATUS AND METHODS", filed Mar. 15, 2013, incorporated above. In one or more implementations, the learning process may comprise a classification process (e.g., comprising a look up table), an artificial neuron network (e.g., a perceptron) and/or other machine learning process.

At operation 804 of method 800, the landscaping robot may be operable in order to produce a design. In one or more implementations, the design may comprise shaping of a lawn, a hedge, ice, soil, sand, e.g., as described above with respect to FIGS. 1-5B.

At operation 806 of method 800, a performance measure associated with the operation of the robot may be determined. In some implementations, the performance measure may comprise a discrepancy determined from actual values of size/position of the design elements being produced (e.g., size/location of letters in the company logo of FIGS. 2,5B), the position of the end effectors/trimmers, the elapsed time, the force being applied to actuators, and/or other parameters that may be determined during operation of the robot and target values of the respective parameter. By way of an illustration, with reference to FIG. 5A, the performance measure may be determined based on a comparison of a 2-dimensional position of the lawnmower 504 and an expected position corresponding to the intersection of the letter P.

At operation 808 of method 800, the learning process may be updated in accordance with the performance measure determined at operation 806. In one or more implementations, the learning process update may comprise modification of one or more entries in a look up table (LUT), adjustment of weights of the ANN, and/or other operations. The learning process adaptation may be used to modify operation of the shaping apparatus in real time based on real-time feedback from trimmers and/or sensors during shaping. The learning process may be configured to detect a discrepancy between the actual and the target shaping performance and update the control process.

Figure 9:
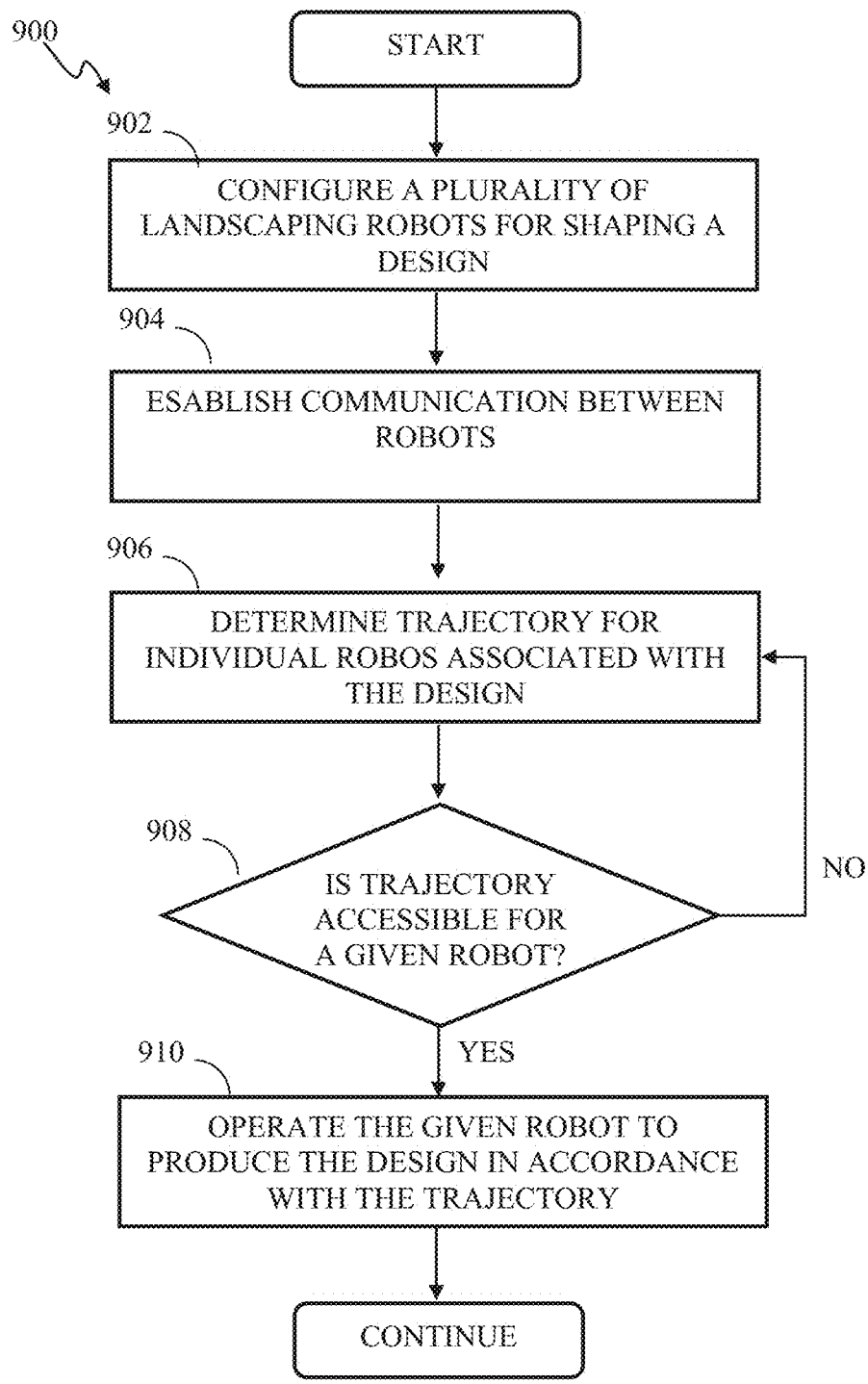
FIG. 9 is logical flow diagram illustrating a method of operating multiple landscaping robots, in accordance with one or more implementations.

FIG. 9 illustrates a method of operating multiple landscaping robots, in accordance with one or more implementations.

At operation 902 of method 900, a plurality of landscaping robots may be configured for shaping a design. In one or more implementations, the operation of configuring the robot may comprise configuring the motorized platform in accordance with the operating surface (e.g., lawn, road, ice, soil, sand, and/or other), configuring the shaping component (e.g., trimmers, blades, shovels, rake, and/or other), configuring liquid delivery component (e.g., attaching a sprayer, filling a tank, and/or other material), configuring communication link parameters (e.g., initializing a wireless communications link (e.g., Wi-Fi, Bluetooth) the communications component 626), configuring the trajectory and/or design operations (e.g., loading design file text and size of the company logo), and/or other configuration. In some implementations, the configuration operation may comprise configuring communication interface (e.g., Wi-Fi, Bluetooth pairing) to enable one and/or two-directional communication between two or more robots. In one or more implementations wherein individual robots may be configured to produce a portion and/or an iteration of the design the tool configuration may comprise outfitting individual robots with appropriate tools (e.g., one robot with a bulk cutter, another robot with a precision cutter, one robot with a shovel, another with a sprayer, and/or other options and or combinations).

At operation 904 of the method 900, the landscaping robot may be configured for feature detection and navigation. In some implementations, the controller configuration may comprise configuring a learning process (e.g., a K nearest-neighbor (kNN) classifier process, etc.), configuring a feature detection process, e.g., detection of edges, corners, color patches, patches of brightness/texture, motion, audio patterns, and/or other persistent signal patterns that may be relevant to a given task.

At operation 906, trajectory associated with the design may be determined for individual robots. In some implementations, wherein individual robots may be configured to produce portions of the design, trajectory for one robot may comprise, e.g., the vertical portion of the letter P in FIG. 5A, and/or a given letter in the design of FIG. 2; while trajectory for another one robot may comprise, e.g., curved portion of the letter P in FIG. 5A, and/or a another letter in the design of FIG. 2. In one or more implementations, wherein individual robots may be configured to operate with a respective precision, trajectory for one robot may comprise, e.g., a single pass along the straight portion of the letter P in FIG. 5A, while trajectory for another robot may comprise, e.g., a loop path along the exterior edges of the vertical portion of the letter P in FIG. 5A, and/or other configurations.

At operation 908 a determination may be made as to whether the trajectory for a given robot is accessible to be navigated. In one or more implementations, the trajectory accessibility may be configured based on detecting presence of another robot proximate the trajectory, e.g., intersection of the portions of the letter P in FIG. 5A, state of the design associated with another robot (e.g., did another robot finish its design portion), presence of obstacles, (e.g., users, animals, debris), and/or other criteria. Responsive to a determination at operation 908 that the trajectory is accessible, the robot may proceed to operation 910 wherein the robot may execute the design in accordance with its trajectory (e.g., determined at operation 906). In some implementations, the robot may be operated autonomously, e.g., using autonomous navigation along a trajectory determined by the design file and/or using feature detection and/or motor control prediction capability. In one or more implementations, the robot may be operated remotely (tele operated) by a user using a remote interface (e.g., radio wave, infrared, sound, and/or other). In one or more implementations of producing a lawn or a hedge design, the design iteration execution may comprise a preliminary ("rough") pass, e.g., performed with a high speed and/or large span cutting tool configured to remove a substantial portion (e.g., greater than 50%) of vegetation. By way of an illustration of design described above with respect to FIG. 5A, the iteration may correspond to grass removal along vertical element of the letter 'P'.

The various methodologies described herein may be utilized for shaping of landscapes (e.g., lawns and/or hedges) into desired 3D patterns or shapes. Users may upload and/or download designs, compete for the best designs, win prizes, upload best examples on YouTube®, and perform other actions associated with shaping and/or landscaping.

A computerized, motorized platform (robot) with a set (matrix or array) of end effectors that may individually extend and retract is disclosed. Individual end effectors may be operable to trim or clip excess vegetation they may come in contact with. As the platform traverses along a trajectory (e.g., hedge and/or lawn), the end effectors may extend/retract to remove excess vegetation (e.g. grass, foliage) so that the remaining vegetation forms the desired 3D shape.

The shaping methodology described herein may be utilized for producing live advertisement (ads), unconventional ads (e.g. visible from an airplane and/or from a vantage point), customized hedges/lawns, landscape art (sculptures), and/or for other applications.

In some implementations, a shaping apparatus may be adapted for shaping other materials, e.g., stucco on building walls, ice, snow, plastic foam, soil, sand, and/or other materials.

In some implementations, the shaping methodology may be used to produce messages visible from air/space, signs (e.g. company logos, public announcements, warnings, directions, etc.), works of art, structural elements for temporary or permanent construction, removal of hazards and obstacles (e.g. downed trees or vegetation close to the power lines), and/or other applications. By way of an illustration, an apparatus of the disclosure may be configured to identify and automatically remove vegetation obscuring road signs, obstructing trails and pathways, encroaching onto power lines, and/or other applications.

Two or more apparatuses of the invention may communicate with one-another (e.g. by WiFi), either directly and/or indirectly (e.g., via a ground station and/or another communications device), to co-operate in performance of the task. In one implementation individual apparatus may be configured to complete a part of the pattern. In one implementation one apparatus may carry out a first pass with a suitable (e.g. faster cutting) tool, and another apparatus (or apparatuses) may carry out incremental measurement and refinement of the pattern with suitable (e.g. more precise or finer cutting) tools. In one implementation an apparatus may be configured to provide watering substance to the plant. In one implementation, an apparatus may be configured to spray water to reduce the dust and debris. In some implementations an apparatus may be configured to take samples of cut material in order to diagnose the state of the vegetation and presence of, for example, heat or water stress, nutrient deficiencies, diseases, pests, parasites, beneficial commensal or harmful organisms, and/or for other applications.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure presented herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles and architectures described herein. This description is in no way meant to be limiting, but rather should be taken as illustrative of the general principles of the disclosure. The scope of the disclosure should be determined with reference to the claims.

What is claimed:

1. A computerized motorized robotic apparatus, comprising:
   a platform comprising a propulsion component;
   a shaping component comprising a plurality of end effectors, where at least one individual end effector is operable to extend and retract; and
   a controller component configured to:
      operate the propulsion component to navigate the platform along a trajectory proximate a landscaping arrangement; and
      operate the plurality of end effectors to produce a three dimensional pattern in the landscaping arrangement.

2. The apparatus of claim 1, where the landscaping arrangement comprises at least one of a grass lawn or a living hedge.

3. The apparatus of claim 2, where: the three dimensional pattern is produced by the removal of at least a portion of foliage of the grass lawn or the living hedge.

4. The apparatus of claim 3, further comprising:
   an analysis component configured to determine a parameter associated with the removed foliage, the parameter being selected from the group consisting of weight, color, and moisture content.

5. The apparatus of claim 3, further comprising:
   an analysis component configured to determine a parameter associated with the removed foliage, the parameter being selected from the group consisting of presence of pesticides, herbicides and parasites.

6. The apparatus of claim 1, where the landscaping arrangement is selected from the group consisting of a soil patch, sand patch, a grass lawn, and a living hedge.

7. The apparatus of claim 1, where:
   the controller component comprises a non-volatile memory; and
   the three dimensional pattern is produced based on a design file stored in the non-volatile memory, the design file comprising a plurality of instructions.

8. The apparatus of claim 7, where the design file comprises:
   a first plurality of instructions configured to cause the propulsion component to navigate the platform along the trajectory; and
   a second plurality of instructions configured to extend and retract the plurality of end effectors in a first dimension of the three dimensional pattern.

9. The apparatus of claim 7, where the navigation of the platform along the trajectory is configured to produce a second dimension of the three dimensional pattern.

10. The apparatus of claim 1, where the three dimensional pattern is a human readable text message.

11. The apparatus of claim 1, where the three dimensional pattern is configured to represent a graphic mark, emblem, or symbol related to an entity.

12. The apparatus of claim 1, further comprising:
a remote communications interface coupled to the controller, the remote communications configured to receive one or more instructions from a remote operator, the instructions configured to effectuate trajectory navigation and pattern production.

13. The apparatus of claim 1, where:
the apparatus comprises an aerial vehicle;
individual ones of the plurality of end effectors comprise a rotating blade; and
the rotating blade is configured to effectuate production of the pattern.

14. The apparatus of claim 1, further comprising:
a sensor component configured to determine a distance between individual ones of the plurality of end effectors and the landscaping arrangement; and
where the controller is configured to determine a deviation between the three dimensional pattern and a target pattern.

15. The apparatus of claim 14, where:
the controller is configured to operate a learning process configured to be adjusted based on the deviation; and
the adjustment is configured to reduce a subsequent deviation during a subsequent production of the target pattern.

16. Autonomous apparatus for removal of vegetation, the apparatus comprising:
a motorized platform configured to displace the apparatus in at least two dimensions on a plane;
a shaping component comprising an actuator coupled to a vegetation removing component;
a nonvolatile memory configured to store information related to a target as well as store a plurality of computer-executable instructions;
a sensor component configured to detect vegetation obstructing the target; and
a processing component configured to execute the plurality of instructions, the instruction execution configured to cause the removal of vegetation thereby exposing the target, the vegetation removal being characterized by an absence of additional instructions being provided by a human operator.

17. A method of producing an advertisement from a living hedge, the method comprising:
providing a design file of the advertisement on a non-volatile computer readable medium;
operating a computerized motorized robotic apparatus, comprising one or more trimmer elements in accordance with the design file;
displacing the apparatus along at least a first dimension; and
removing a portion of the living hedge along a second dimension thereby producing a two dimensional pattern in the living hedge.

18. The method of claim 17, where the act of removing along the second dimension comprises removing the portion of the living hedge along the second dimension and displacing the apparatus along the first dimension, the first dimension being substantially orthogonal to the second dimension.

19. The method of claim 17, where operating the computerized motorized robotic apparatus comprises displacing the apparatus along a third dimension, the third dimension being substantially orthogonal to the first dimension.

20. The method of claim 17, where operating the computerized motorized robotic apparatus comprises removing a portion of the living hedge along a third dimension, the third dimension being substantially orthogonal to the second dimension.

* * * * *